United States Patent Office 3,428,678
Patented Feb. 18, 1969

3,428,678
2-METHYL-2-(β-CHLOROETHYL) ACID
HYDRAZIDE HYDROCHLORIDES
Donald L. Trepanier, Indianapolis, Ind., assignor to The
Dow Chemical Company, Midland, Mich., a corporation of Delaware
No Drawing. Continuation-in-part of application Ser.
No. 547,432, May 4, 1966. This application Sept.
28, 1966, Ser. No. 582,553
U.S. Cl. 260—558     4 Claims
Int. Cl. C01d 87/00

ABSTRACT OF THE DISCLOSURE 2-methyl-2-(β-chloroethyl) acid hydrazide hydrochlorides are prepared by the reaction of β-hydroxyethyl hydrazides with thionyl chloride. The novel compounds such as benzoic acid 2-(β-chloroethyl)-2-methylhydrazide hydrochloride are useful as pesticides, chemical intermediates and as antidepressants.

---

This is a continuation-in-part of my application Ser. No. 547,432, filed May 4, 1966, now abandoned.

The present invention is directed to novel acid hydrazide compounds corresponding to the formula:

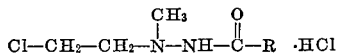

In the present specification and claims, R represents phenyl, tolyl, furyl, mono- and dihalophenyl and mono-, di- and trimethoxyphenyl wherein halo represents chlorine and bromine. The novel compounds may be named either as 2-methyl-2-(β-chloroethyl) acid hydrazide hydrochlorides or as 1-methyl-1-(β-chloroethyl)-2-(acyl substituted)-hydrazine hydrochlorides. In the present specification and claims, the compounds are named as acid hydrazides. The compounds of the present invention are crystalline solids which are slightly soluble in water and are somewhat soluble in organic solvents such as methanol, ethanol, dimethylformamide and dimethylsulfoxide. These novel compounds have been found useful as intermediates in the preparation of 2-substituted-4-methyl-5,6-dihydro-4H-1,3,4-oxadiazines. These oxadiazines and methods of their preparation from the acid hydrazides of the present invention are disclosed and claimed in my copending application Ser. No. 582,551, filed concurrently herewith. The novel hydrazide compounds have been found to be useful pharmacologically in studying drug effects in the central nervous system, for example, in rodents, and particularly in combating reserpine-induced depression and in prolonging the stimulation produced by the administration of 3,4-dihydroxyphenyl-L-alanine (DOPA). Thus, the compounds of the present invention act as monoaminoxidase inhibitors and may be employed as antidepressants or psychic energizers. They have also been found to be useful as pesticides for the control of such representative organisms as plants and helminths.

The 2-(β-chloroethyl) acid hydrazide compounds of the present invention are prepared by the reaction of β-hydroxyethyl hydrazide corresponding to the formula

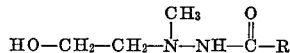

with thionyl chloride. In a convenient procedure, the reaction can be carried out in the presence of an inert organic solvent as reaction medium. However, in a preferred procedure, the production of the compounds of the present invention is carried out in excess thionyl chloride as reaction medium. The reaction proceeds readily at temperatures of from 25° to 90° C. with the production of the desired product and sulfur dioxide of reaction. The proportions of the reactants to be employed are not critical, some of the desired product being produced when contacting the reactants in any proportions. However, the reaction in going to completion consumes equimolar proportions of the reactants and the use of the reactants in such proportions is preferred.

In carrying out the production of the desired products, the thionyl chloride and β-hydroxyethyl hydrazide are contacted in any order or fashion. In a convenient procedure, excess thionyl chloride is employed as reaction medium. Following the contacting of the reactants, the reaction mixture is heated at a temperature within the reaction temperature range for a short period of time. Following the reaction period, the reaction mixture is diluted with an organic solvent such as ether, ligroin, carbon tetrachloride or hexane to precipitate the desired product. The desired product is then separated from the reaction mixture by such conventional procedures as filtration, centrifugation or decantation.

The following examples are merely illustrative and are not intended to be limiting.

EXAMPLE 1

Thionyl chloride (20 milliliters) was stirred and heated to a temperature of 50° C. To this stirred liquid was added slowly portionwise 0.5 gram of benzoic acid 2-(β-hydroxyethyl)-2-methylhydrazide. Thereafter, stirring was continued and the reaction mixture was maintained at a temperature of 50° C. for three hours. Following the heating period, the reaction mixture was cooled to room temperature and diluted with 50 milliliters of dry ether. During the dilution procedure, the product precipitated as a crystalline solid. This crystalline solid was collected by filtration, washed with dry ether and recrystallized from methanol to give benzoic acid 2-(β-chloroethyl)-2-methylhydrazide hydrochloride melting at 183°–184° C. The product was found by elemental analysis to have carbon, hydrogen and nitrogen contents of 48.56 percent, 5.82 percent and 10.94 percent, respectively, as compared with the theoretical contents of 48.23 percent, 5.66 percent and 11.26 percent, respectively.

EXAMPLE 2

Thionyl chloride (200 milliliters) and p-chlorobenzoic acid 2-(β-hydroxyethyl)-2-methylhydrazide (12 grams) were mixed together in exactly the same fashion as set forth in Example 1. After heating as in said example, the reaction mixture was diluted with 300 milliliters of dry ether and the desired product separated from the reaction mixture in the manner set forth in Example 1. The product thus obtained was recrystallized from isopropanol. The recrystallized p-chlorobenzoic acid 2-(β-chloroethyl)-2-methylhydrazide hydrochloride product was found to melt at 183.5°–186° C. The compound was found by elemental analysis to have carbon, hydrogen and nitrogen contents of 42.24 percent, 4.55 percent and 9.67 percent, respectively, as compared with the theoretical contents of 42.35 percent, 4.62 percent and 9.88 percent, respectively.

In substantially the same procedure, the following hydrazides are prepared:

2-furoic acid 2-(β-chloroethyl)-2-methylhydrazide hydrochloride, having a molecular weight of 238, is prepared by mixing 2-furoic acid 2-(β-hydroxyethyl)-2-methylhaydrazide with excess thionyl chloride; and o-Chlorobenzoic acid 2-(β-chloroethyl)-2-methylhydrazide hydrochloride, having a molecular weight of 278.5, is prepared by mixing o-chlorobenzoic acid 2-(β-hydroxyethyl)-2-methylhydrazide with excess thionyl chloride.

EXAMPLE 3

Thionyl chloride (500 milliliters) was stirred and heated to a temperature of 50° C. To this stirred liquid was added slowly portionwise p-toluic acid 2-(β-hydroxyethyl)-2-methylhydrazide (54.5 grams; 0.26 mole). Thereafter, stirring was continued and the reaction mixture was maintained at a temperature of 50°–55° C. Thirty minutes after addition was complete, a precipitate began to form and 300 milliliters additional thionyl chloride were added. Following the heating period, the reaction mixture was cooled to room temperature and diluted with dry ether. This crystalline solid was collected by filtration, washed with dry ether and recrystallized from methanol. Additional solids were collected by treating the filtrate with ether and filtering. The combined p-toluic acid 2-(β-chloroethyl)-2-methylhydrazide hydrochloride product was recrystallized from methanol and found to melt at 190°–193° C. with decomposition. The product was found by elemental analysis to have carbon, hydrogen and chlorine contents of 50.17 percent, 6.30 percent and 28.03 percent, respectively, as compared with the theoretical contents of 50.20 percent, 6.13 percent and 26.95 percent, respectively.

In substantially the same procedure, the following hydrazide hydrochlorides were prepared:

3,4,5 - trimethoxybenzoic acid 2 - (β - chloroethyl)-2 - methylhydrazide hydrochloride, melting at 191°–192° C. with decomposition, was prepared by mixing 3,4,5 - trimethoxybenzoic acid 2 - (β - hydroxyethyl)-2-methylhydrazide with excess thionyl chloride and recrystallizing the product from ethanol. (C, H and Cl: calculated, 46.03, 5.94 and 20.90 percent; found by analysis, 46.42, 6.14 and 20.50 percent, respectively.)

p-Anisic acid 2-(β-chloroethyl)-2-methylhydrazide hydrochloride, melting at 162.5°–164° C. with decomposition, was prepared by mixing p-anisic acid 2-(β-hydroxyethyl)-2-methylhydrazide with excess thionyl chloride and recrystallizing the product from isopropanol. (C, H and Cl: calculated, 47.32, 5.78 and 25.40 percent; found by analysis, 47.15, 6.20 and 26.57 percent, respectively.)

3,4-dichlorobenzoic acid 2-(β-chloroethyl)-2-methylhydrazide hydrochloride, melting at 189°–192° C. with decomposition, was prepared by mixing 3,4-dichlorobenzoic acid 2-(β-hydroxyethyl)-2-methylhydrazide with excess thionyl chloride and recrystallizing the product from methanol. (C, H and Cl: calculated, 37.76, 3.80 and 44.95 percent; found by analysis, 38.91, 4.12 and 43.38 percent, respectively.)

m - Bromobenzoic acid 2 - (β-chloroethyl)-2-methylhydrazide hydrochloride, melting at 158°–160° C., was prepared by mixing m-bromobenzoic acid 2-(β-hydroxyethyl)-2-methylhydrazide with excess thionyl chloride.

EXAMPLE 4

Benzoic acid 2-(β-chloroethyl)-2-methylhydrazide hydrochloride was administered to albino mice at a dosage rate of 100 milligrams per kilogram by intraperitoneal injection. Injections at such dosages were carried out successively at intervals of 72, 48, 24 and 2 hours for a total of four doses prior to challenging with 3,4-dihydroxyphenyl-L-alanine (DOPA). Five mice were so treated with each compound tested. During the pretreatment period, the animals were examined for gross signs of alteration such as depression, weight loss or the like. No changes from normal were observed. Two hours after the last dosage of the hydrazide compound, DOPA was administered to each mouse at a dosage rate of 200 milligrams per kilogram body weight. The mice were then observed for symptoms of hyper-irritability. The mice treated with benzoic acid 2-(β-chloroethyl)-2-methylhydrazide hydrochloride showed a marked increase in irritability accompanied by signs of spontaneous activity.

When DOPA is administered to controls which have not received any hydrazide compound of the present invention (or any other known monoaminoxidase inhibitor), little or no effect is observed.

EXAMPLE 5

Benzoic acid 2-(β-chloroethyl)-2-methylhydrazide hydrochloride was administered to albino mice at a dosage rate of 100 milligrams per kilogram by intraperitoneal injection. Injections at such dosages were carried out successively at intervals of 72, 48, 24 and 2 hours for a total of four doses prior to challenging with reserpine. Five mice were so treated with each compound tested. During this pretreatment period, the animals were examined for gross signs of alteration, depression, weight loss or the like. No changes from normal were observed. Two hours after the last dose of the hydrazide compound, reserpine was administered to each mouse at a dosage rate of 100 milligrams per kilogram.

The administration of 5 milligrams of reserpine per kilogram intraperitoneally to otherwise untreated mice results in a progression of signs starting with drooping of the eyelids (ptosis) and pilo-erection and culminating in a generalized depression with decreased spontaneous motor activity and decreased responsiveness to auditory or tactile stimuli.

Following the administration of the reserpine, the test animals were observed for the above signs of depression. The mice treated with benzoic acid 2-(β-chloroethyl)-2 methylhydrazide hydrochloride showed a two hour protection from ptosis and depression.

The responses such as were observed in Examples 4 and 5 have been found to be characteristic of monoaminoxidase inhibitor compounds which have demonstrated anti-depressant pharmacological activity in vivo. (Annals of the New York Academy of Sciences, vol 80, Art. 3, pp. 551–1,046; 1959.)

In other operations, mice naturally infected with pinworms were fed for seven consecutive days on a diet containing p-anisic acid 2 - (β-chloroethyl)-2-methylhydrazide hydrochloride as the sole toxicant therein and at a toxicant concentration of 0.06 percent of the total diet. Necropsy findings at the end of the test period showed complete control of the pinworms.

The substituted hydroxyethyl hydrazides employed as starting materials are described and claimed in my copending application Ser. No. 582,549, filed even date herewith. Such subject matter is also disclosed in Trepanier et al., Journal of Organic Chemistry, 29, 673–677 (1964), and 30, 2228–2234 (1965), and Trepanier et al., Journal of Heterocyclic Chemistry, 2, 403–409 (1965). In 1964 Trepanier et al. taught that "2-(β-hydroxyalkyl) acid hydrazides . . . were prepared by N-acylation of appropriate hydrazino alcohols with acid chlorides," that "acylation of hydrazino alcohols containing a primary hydroxyl group yielded . . . the O,N-diacyl compound" by the reaction

and that "the O-acyl moiety could be preferentially removed by mild alkaline hydrolysis . . . ," J. Org. Chem. 29, 673–677, at 674 (1964).

I claim:

1. A 2 - methyl - 2-(β-chloroethyl) acid hydrazide hydrochloride corresponding to the formula

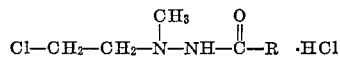

wherein R represents a member of the group consisting of phenyl, tolyl, halophenyl, dihalophenyl, methoxyphenyl, dimethoxyphenyl, trimethoxyphenyl and furyl in which halo represents a member of the group consisting of chlorine and bromine.

2. The 2 - methyl-2-(β-chloroethyl) acid hydrazide hydrochloride compound claimed in claim 1 wherein the compound is benzoic acid 2 - (β-chloroethyl)-2-methylhydrazide hydrochloride.

3. The 2 - methyl-2-(β-chloroethyl) acid hydrazide hydrochloride compound claimed in claim 1 wherein the compound is p-chlorobenzoic acid 2-(β-chloroethyl)-2-methylhydrazide hydrochloride.

4. The 2 - methyl-2-(β-chloroethyl) acid hydrazide hydrochloride compound claimed in claim 1 wherein the compound is p-anisic acid 2-(β-chloroethyl)-2-methylhydrazide hydrochloride.

References Cited

FOREIGN PATENTS 636,613  2/1962  Canada.

OTHER REFERENCES

Ishidate et al.: Chem. Abst., vol. 55, column 10465 (1965).

Trepanier et al.: Jour. of Med. Chem., vol. 9, pages 753-8 (1966).

NORMA S. MILESTONE, *Primary Examiner.*

NATALIE TROUSOF, *Assistant Examiner.*

U.S. Cl. X.R.

71—88, 118; 260—244, 347.3, 559; 424—324